US 9,776,129 B2

(12) United States Patent
Heirman

(10) Patent No.: US 9,776,129 B2
(45) Date of Patent: Oct. 3, 2017

(54) DEVICE AND METHOD FOR SEPARATING GASES

(71) Applicant: ATLAS COPCO AIRPOWER, NAAMLOZE VENNOOTSCHAP, Wilrijk (BE)

(72) Inventor: Peter Jozef Heirman, Wilrijk (BE)

(73) Assignee: ATLAS COPCO AIRPOWER, NAAMLOZE VENNOOTSCHAP, Wilrijk (BE)

(*) Notice: Subject to any disclaimer, the term of this patent is extended or adjusted under 35 U.S.C. 154(b) by 0 days.

(21) Appl. No.: 14/386,414

(22) PCT Filed: Mar. 5, 2013

(86) PCT No.: PCT/BE2013/000011
§ 371 (c)(1),
(2) Date: Sep. 19, 2014

(87) PCT Pub. No.: WO2013/138874
PCT Pub. Date: Sep. 26, 2013

(65) Prior Publication Data
US 2015/0047502 A1    Feb. 19, 2015

(30) Foreign Application Priority Data
Mar. 19, 2012    (BE) .................. 2012/0191

(51) Int. Cl.
*B01D 53/22*    (2006.01)
*B01D 63/00*    (2006.01)
*C01B 21/04*    (2006.01)

(52) U.S. Cl.
CPC ............ *B01D 53/22* (2013.01); *B01D 63/00* (2013.01); *C01B 21/0438* (2013.01);
(Continued)

(58) Field of Classification Search
CPC .. B01D 53/22; B01D 2053/221; B01D 63/00; B01D 2311/14; B01D 2313/24; C01B 21/0438
(Continued)

(56) References Cited

U.S. PATENT DOCUMENTS 4,806,132 A * 2/1989 Campbell .............. B01D 53/22
                                                          95/12
4,857,082 A * 8/1989 DiMartino, Sr. ...... B01D 53/22
                                                          95/19
(Continued)

FOREIGN PATENT DOCUMENTS

CN          1191763 A        9/1998
DE     102010003507 A1      10/2011
(Continued)

OTHER PUBLICATIONS

International Search Report for corresponding International PCT Application No. PCT/BE2013/000011, Jul. 4, 2013.
(Continued)

*Primary Examiner* — Jason M Greene
(74) *Attorney, Agent, or Firm* — Workman Nydegger

(57) ABSTRACT

A device for separating gases comprises the following components: a source for the gases and flow adjustment means; a membrane unit for the production of a permeate gas and a retentate gas, one of which is the product gas; purity determining means for the product gas; a first control unit for the device; a retentate control system and a product gas pressure measurement, whereby the source has a second control unit for the flow adjustment means as a function of a target value of the gases and the first control unit is connected to the second control unit and to the retentate control system, whereby the first control unit can determine the target value and can control the retentate control system.

19 Claims, 3 Drawing Sheets

(52) U.S. Cl.
CPC .... *B01D 2053/221* (2013.01); *B01D 2311/14* (2013.01); *B01D 2313/24* (2013.01)

(58) Field of Classification Search
USPC ........................................ 95/12, 22, 45; 96/4
See application file for complete search history.

(56) References Cited

U.S. PATENT DOCUMENTS

| | | | |
|---|---|---|---|
| 5,053,058 A * | 10/1991 | Mitariten | B01D 53/22 |
| | | | 96/4 |
| 5,281,253 A * | 1/1994 | Thompson | B01D 53/226 |
| | | | 95/22 |
| 5,284,506 A * | 2/1994 | Barbe | B01D 53/22 |
| | | | 95/23 |
| 5,470,379 A * | 11/1995 | Garrett | B01D 53/22 |
| | | | 95/12 |
| 5,496,388 A * | 3/1996 | Tellier | B01D 53/22 |
| | | | 96/4 |
| 5,649,995 A | 7/1997 | Gast, Jr. | |
| 5,730,780 A | 3/1998 | Booth, III | |
| 5,989,312 A * | 11/1999 | Barnhard | B01D 53/22 |
| | | | 95/10 |
| 6,273,936 B1 * | 8/2001 | Barry | B01D 53/047 |
| | | | 95/12 |
| 6,629,525 B2 | 10/2003 | Hill et al. | |
| 6,651,658 B1 | 11/2003 | Hill et al. | |
| 2002/0096174 A1 * | 7/2002 | Hill | B01D 53/22 |
| | | | 128/205.11 |
| 2006/0169506 A1 | 8/2006 | Handa et al. | |

FOREIGN PATENT DOCUMENTS

| | | | |
|---|---|---|---|
| EP | 0409545 A2 | 1/1991 | |
| EP | 1 324 815 A * | 7/2003 | ............ B01D 53/22 |
| EP | 1324815 A1 | 7/2003 | |
| JP | 2002035530 A | 2/2002 | |
| JP | 2002045424 A | 2/2002 | |
| JP | 2002068081 A | 3/2002 | |
| JP | 2002068112 A | 3/2002 | |
| JP | 2002221400 A | 8/2002 | |
| JP | 2002221900 A | 8/2002 | |
| JP | 2006205925 A | 8/2006 | |
| JP | 2010087305 A | 4/2010 | |
| JP | 2012006825 A | 1/2012 | |

OTHER PUBLICATIONS

Japanese Office Action from Japanese Application No. 2015-500719, Feb. 1, 2016.

* cited by examiner

DEVICE AND METHOD FOR SEPARATING GASES

FIELD OF THE INVENTION

The present invention relates to a device and a method for separating gases.

More specifically the invention relates to a device and method for separating a mixture of gases by means of a membrane installation with selective membranes, i.e. membranes that have a different permeability for different gases based on the properties of these gases.

BACKGROUND

Depending on the situation the desired product can be the permeate, thus the gas that is passed through the membrane wall, or the retentate, thus the gas that has not passed through the membrane wall.

Traditionally such a device for separating mixtures of gases comprises a compressor installation in which the pressure of the feed gas, which in reality is a gas mixture, for example air, is increased, and a membrane installation in which the feed gas is separated into a permeate gas and a retentate gas, for example oxygen and nitrogen.

Because selective membranes are very expensive and constitute a large proportion of the total costs of such an installation, because the capacity of such an installation is approximately proportional to the pressure, and because the energy required for the compression of the feed gas increases much less than linearly with the pressure, the total cost of the operation of such a device can be reduced by increasing the operating pressure to substantially above the desired product gas pressure.

In order to keep this operating pressure constant, such a device is generally equipped with a minimum pressure valve, which, independent of the offtake and thus the product gas pressure by the consuming installation, keeps the operating pressure in the membrane unit at the desired level.

If the required product gas flow of such a device is less than the nominal design flow, the product purity is higher than the design purity and the recuperation level falls, i.e. the product gas flow/feed gas flow ratio, at least for devices in which the retentate gas is the desired product.

This is disadvantageous because too pure a product gas can be technically undesirable in the application, and because the processing of an unnecessarily high feed rate brings about unnecessary costs.

Methods and devices to improve this are described for example in EP 1.324.815, U.S. Pat. No. 5,496,388, U.S. Pat. No. 5,649,995 and DE 10.2010.003.507.

EP 1.324.815 describes a device and an accompanying method in which a speed controlled compressor is used as a compressor installation, which adjusts the speed of the compressor on the basis of a gas sensor in the product gas, or possibly another sensor that yields a value that is characteristic of the product gas purity.

This has the disadvantage that this method only works with speed controlled compressors and not with compressor types that are controlled in another way.

As a result of this, if the compressor is also operating at its minimum capacity and the product gas flow decreases further, the desired product purity is not obtained but a product purity that is too high.

A further disadvantage is that the speed of a compressor cannot just be adjusted without the risk of damage or requiring frequent maintenance. This speed range is not necessarily known, or its importance is not necessarily recognised by the designer of a membrane installation, such that there is a risk of premature failure of the compressor. This is all the more so because the acceptable speed range can be a complex function of other parameters of the compressor, such as the operating pressure.

Another disadvantage is that the solution of EP 1.324.815 is not a solution if the compressor installation, in addition to supplying the membrane unit, is also a supply for another installation, with its own requirement, such as a compressed air network.

U.S. Pat. No. 5,496,388 describes a device in which a screw compressor is used, that is equipped with a slide valve at the level of the screws, and which, if certain conditions are satisfied, is controlled on the basis of a measuring signal from a sensor that measures the purity of the product gas, such that the capacity of the feed gas is controlled.

This solution also has the disadvantage that it is not a solution if the compressor installation, in addition to supplying the membrane installation, also supplies another installation, with its own requirement, such as a compressed air network.

A further disadvantage is that this adjustment and method can only be applied to compressors that are equipped with a slide valve.

U.S. Pat. No. 5,649,995 describes a device in which the purity of the product gas is controlled, not by controlling the compressor, but by constructing the traditional known minimum pressure valve in the retentate gas outlet as a control valve, which is controlled on the basis of the purity of the product gas measured by a purity sensor, in order to obtain a constant purity of product gas in this way.

A disadvantage of this is that the product gas flow cannot be hereby controlled.

A lot of compression energy is hereby lost because the compressor is always operating at full capacity, thus supplying a large flow of gas at high pressure, which then generally has to be expanded.

In DE 10.2010.003.507 a reduction of the gas supplied to the membrane unit is effected by placing a control valve between the compressor and the membrane unit, which adjusts the inlet flow on the basis of a parameter of the product gas, for example purity or pressure, whereby the compressor is controlled via an on-off control, and pressure variations therein are accommodated by a buffer volume placed directly after the compressor.

The traditional devices, including the said improvements, all have the disadvantage that if the offtake of product gas is greater than the design capacity of the installation, the purity becomes lower than the design value. This can lead to hazardous situations for example when nitrogen with a low oxygen content is produced to prevent explosions.

Moreover the improvements do not prevent the problem of too high a product gas purity when the product gas offtake is low.

The said controls of compressors are also complex or cannot be constructed when compressors other than the said specific types of controllable compressors are used, and certainly not when different types of compressors are used in one compressor installation.

Also the known solutions to control the purity do not take account of important aspects of the operation of compressors, such as minimum energy consumption, maximum lifetime and optimum maintenance intervals, which are all greatly influenced by the operating conditions of a compressor.

SUMMARY

The purpose of the present invention is to provide a solution to at least one of the aforementioned and other disadvantages, by providing a device for separating a mixture of gases into a product gas with certain purity requirements and a residual gas, and this device comprises the following components:

a source for supplying the mixture under pressure and adjustment means to adapt the flow to be supplied by the source;

a membrane unit connected to the source that can separate the mixture into a permeate gas and a retentate gas, one of which is the product gas;

means for determining the purity of the product gas; and a first control unit for controlling the device, whereby:

the source is equipped with a second control unit that can control the adjustment means as a function of a target value at a point between the source and the membrane unit;

the device is equipped with a retentate control system and a measuring instrument for the pressure of the product gas;

the first control unit has a control connection to the second control unit and to the retentate control system whereby the first control unit comprises an algorithm that can determine the target value on the basis of the pressure and purity of the product gas and can control the retentate control system.

An advantage of this is that the desired purity of the product gas in such a device can always be guaranteed, even if the demanded product gas flow is greater than the design flow of the device.

The retentate control system can hereby be constructed in different ways, for example as a retentate control valve that forms a variable flow resistance for the retentate, or as a combination of parallel open/closed valves, each with a different flow resistance in an open state, and this combination can form a specific flow resistance by selectively opening and closing a number of valves.

In such a device the quantity of feed gas that has to be supplied under pressure, in order to obtain a desired product gas flow that is lower than the design flow at a desired purity, is less than in the known devices, such that energy and feed gas can be saved.

A further advantage is that the pressure is only built up to such a level as needed for the desired production, such that energy is saved.

A further advantage of such a device is that the device can operate at high pressure and thus can be more compact and cheaper, while the pressure of the product gas is not higher than the desired value, such that higher leak losses in the distribution network of the product gas as a result of higher pressure are prevented, and thereby the need to produce more than the actual required quantity of product gas.

A further advantage is that the device is self-compensating for the ageing and the fouling level of the membranes.

In a preferred embodiment the source is a compressor unit that comprises the adjustment means, with an outlet that is connected to the membrane unit and the target value is a target value at the outlet.

This has the advantage that the compressor unit can consist of all compressor types such as, but not exhaustively, reciprocating compressors, gear compressors, screw compressors and turbo compressors or combinations, and with all types of controllers such as, but not exhaustively, on/off control, loaded/unloaded control, speed control, modulating inlet control, control with a slide valve or a combination thereof.

As a derived benefit the compressor unit can hereby easily consist of a combination of compressors that enable one of the compressors to be maintained, while one or more other compressors continue to feed the membrane unit.

The device according to the invention also has the advantage that other devices can be connected to the compressor unit without interfering with the good operation of the device for separating gases.

The control of a device described above does not interfere with the optimum control of the compressors either, which is done independently by the controller of the compressor unit, and which takes account of aspects such as maximum safety, lifetime, minimum energy consumption, limited pressure control range and optimised maintenance periods.

In a preferred practical embodiment the target value is a target pressure.

Because pressure is a universal property against which compressors can be controlled, this gives extra flexibility relating to the way in which a variety of compressors can be fitted in the device.

In a further preferred embodiment the device is equipped with an inlet gas control system between the compressor unit and the membrane unit, and the first control unit has a control connection to the inlet gas control system.

The inlet gas control system can hereby be constructed in different ways, for example as an inlet gas control valve that forms a variable flow resistance for the inlet gas, or as a combination of parallel open/closed valves, each with a different flow resistance in the open state, and this combination can form a specific flow resistance by selectively opening and closing a number of valves.

In this way the device can also continue to operate well when the target pressure determined by the control unit is lower than the minimum operating pressure of the compressor unit, because then the compressor unit can operate at its minimum operating pressure and the inlet gas control system reduces the gas pressure that the membrane unit receives to the target pressure determined by the control unit.

In a further preferred embodiment the retentate is the product gas and the device is equipped with a permeate control system to which the first control unit has a control connection.

The permeate control system can hereby be constructed in different ways, for example as a permeate control valve that forms a variable flow resistance for the permeate, or as a combination of parallel open/closed valves, each with a different flow resistance in an open state, and this combination can form a specific flow resistance by selectively opening and closing a number of valves.

Thanks to this permeate control system, even in situations in which the retentate control system is completely open and the purity of the product gas can thus not be reduced by further opening this retentate control system, the purity is reduced and thus brought to the desired level by partly closing the permeate control system and thereby increasing the pressure on the permeate side of the membrane unit.

The invention also comprises a method for separating a mixture of gases into a product gas with certain purity requirements and a residual gas, wherein:

the pressure of the mixture is increased;

the mixture at an increased pressure is driven through a membrane unit in order to be separated into a permeate gas and retentate gas, one of which is the product gas; and the purity of the product gas is determined, wherein:

the pressure of the product gas is measured, and the pressure and purity of the product gas are controlled against reference values by a first control unit by partly expanding the retentate and by imposing a target value for the pressurised gas before it flows into the membrane unit at a second control unit that controls adjustment means to obtain this target value.

In a preferred embodiment the pressure of the mixture is increased in a compressor unit provided with adjustment means. If the compressor unit operates at its minimum capacity, the pressure of the mixture that is brought to the membrane unit is made lower than the pressure at the outlet of the compressor unit by expanding this mixture.

In a further preferred embodiment, if the retentate gas is the product gas, and the purity of the product gas is too high while the product gas pressure cannot be reduced, this purity is controlled by adjusting the permeate pressure.

The device and method according to the invention enable, in order of decreasing priority:

A) Product gas to be produced with the correct purity;
B) The demanded quantity of product gas to be produced with respect for A;
C) A and B to be produced with the smallest possible quantity of gas mixture.
D) A, B and C to be realised as energy-efficiently as possible;
E) A, B, C and D to be realised with an optimum lifetime of the device.

BRIEF DESCRIPTION OF THE DRAWINGS

With the intention of better showing the characteristics of the invention, a device according to the state of the art and two variants of devices according to the invention are described hereinafter, with their accompanying methods, by way of an example, without any limiting nature, with reference to the accompanying drawings, wherein.

DETAILED DESCRIPTION OF VARIOUS EMBODIMENTS

Figure 1:
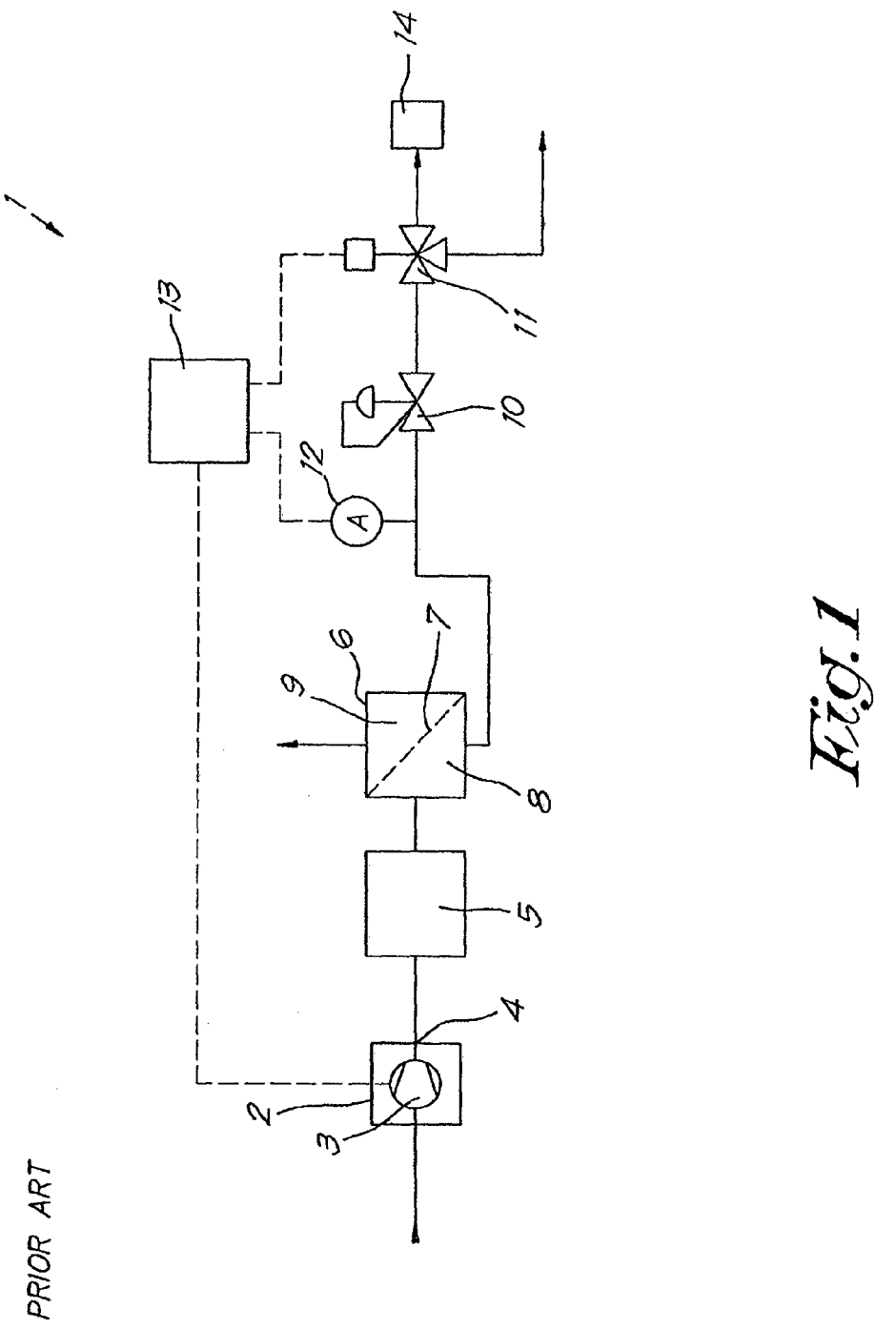
FIG. 1 schematically shows a known device.

The device 1 shown in FIG. 1 is a device for producing nitrogen from air, whereby the nitrogen has a certain minimum purity.

This device 1 comprises a compressor unit 2 with a compressor 3, whose outlet 4 is connected via a gas treatment unit 5 to a membrane unit 6 that is provided with a membrane 7 that has greater permeability for oxygen than for nitrogen. The membrane 7 separates the retentate side 8 from the permeate side 9 of the membrane unit 6.

The compressor unit 2 can also comprise a gas dryer, not shown.

The retentate side 8 is connected to a minimum pressure valve 10 and a three-way valve 11. Between the minimum pressure valve 10 and the membrane unit 6 is an oxygen sensor 12.

The oxygen sensor 12 is connected in a signal-transferring manner to a control unit 13 that is provided with an algorithm to adjust the capacity at which the compressor operates by means of a slide valve at the inlet, depending on the oxygen concentration measured by the oxygen sensor 12.

The control unit 13 is also connected controllingly to the three-way valve 11.

The operation of this device 1 to produce nitrogen from air is as follows.

The compressor 3 draws in air from the outside, compresses it and drives it at an increased pressure to the gas treatment unit 5 where impurities are removed and the air is heated.

Then the compressed air flows to the membrane unit 6 where it is separated by means of the membrane 7 into a permeate that consists of a nitrogen/oxygen mixture with an increased oxygen content with respect to air, and a retentate that is nitrogen with a low oxygen content.

The permeate is residual gas and can be vented to the outside air.

The retentate, which is the product gas, is then supplied via the minimum pressure valve 10 and the three-way valve 11 to an installation, that does not belong to the device, that needs this product, for example a nitrogen network 14.

The pressure in the membrane unit 6 is kept at a desired level by the minimum pressure valve 10, which is set to a certain pressure.

The oxygen sensor 12 continually measures the oxygen content of the retentate and passes on this measured value to the control unit 13, which uses this value to control the compressor 3.

If the oxygen content is higher than desired, the position of the slide valve is adjusted to this end so that the compressor operates at a higher capacity. If the oxygen content is less than desired, the opposite happens.

If the measured oxygen content exceeds certain limits, the three-way valve 11 is controlled by the control unit 13, with the result that, to prevent the supply of a product gas that is outside the required specifications, the three-way valve 11 goes to such a position that the product gas is vented off.

Such situations primarily occur when starting up/switching off the device, or when the flow demanded by the nitrogen network 14 is greater than the design limit of the device 1.

The device 15 according to the invention shown in FIG. 2 has a number of differences to the device 1 shown in FIG. 1, which are set out hereinafter.

A first difference is that there is no minimum pressure valve 10.

A second difference is that the compressor unit 2 is provided with a controller 16 that can control a large number, in this case but not necessarily two, of compressors 3A and 3B, as a function of an imposed pressure at the outlet 4, whereby the control unit 13 is connected to the controller 16, instead of directly to an adjustment means in order to adjust the capacity of a compressor, such as a slide valve or a variable speed motor.

In order to be able to do this there must of course be a pressure sensor in the compressor unit, which is not shown.

A third difference is that between the compressor unit 2 and the gas treatment unit 5 there is an inlet gas control valve 17, to which the control unit 13 has a control connection.

A fourth difference is that at the outlet of the membrane unit 6 on the permeate side 9 there is a permeate control valve 18 to which the control unit 13 has a control connection.

A fifth difference is that at the outlet of the membrane unit 6 on the retentate side 8, there is a retentate control valve 19 between the membrane unit 6 and the oxygen sensor 12, to which the control unit 13 has a control connection.

A sixth difference is that between the three-way valve 11 and the retentate control valve 19 there is a pressure sensor 20, that is connected in a signal transferring manner to the control unit 13.

A seventh difference is that there is a connection point 21 between the compressor unit 2 and the inlet gas valve 17, to which another installation 22 that requires compressed air can be connected.

The operation of the device 15 according to the invention, in this case described for the production of nitrogen from air, is as follows.

The compressors 3A and 3B draw in air from the outside and compress it to a certain target pressure. This target pressure is a pressure known at the controller 16, which is imposed by the control unit, whereby the controller 16 controls the compressors 3A, 3B such that this target pressure is reached, thereby taking account of the optimisation of operational aspects of the compressors 3A, 3B, such as safety, lifetime, energy consumption, pressure control range and maintenance periods.

The controller 16 hereby also takes account of the minimum pressure requirement of any other installation 22 connected to the connection point 21.

The air pressurised to the target pressure is guided via the inlet gas control valve 17 to the gas treatment unit 5, where impurities are removed and the gas mixture is heated.

Then the air flows to the membrane unit 6, where it is separated by means of the membrane 7 into a permeate that consists of a nitrogen/oxygen mixture with an increased oxygen content with respect to air, and a retentate that is nitrogen with a low oxygen content.

The permeate is removed by the permeate control valve 18.

The retentate, which is the product gas, is then supplied via the retentate control valve 19 and the three-way valve 11 to an installation, that does not belong to the device, that needs this product, for example a nitrogen network 14.

The device 15 is controlled by the control unit 13. This controls the product gas pressure and the product purity, that are both imposed by the installation that needs the product gas, for example a nitrogen network 14.

The control of the product gas pressure operates such that the product gas pressure, which is measured by the pressure sensor 20, is controlled at a certain reference value because the control unit adjusts the target pressure at the outlet 4 of the compressor unit 2 that the control unit 13 passes on to the controller 16.

If this target pressure lies within the region in which the compressors 3A, 3B can operate within the pre-imposed conditions regarding their operational aspects, and within any limits imposed by another connected installation 22, the controller 16 controls the compressors 3A, 3B such that they operate optimally. If applicable this can also mean that only one of the two compressors 3A, 3B is operating, and the other is stopped.

If the target pressure imposed by the control unit 13 is less than the pressure at which the compressor unit 2 must operate, the target pressure will be the lowest acceptable pressure and the pressure supplied to the rest of the device 15 is reduced by the inlet gas valve 17, so that a low operating pressure of the membrane unit 6 is nonetheless obtained.

The inlet gas control valve 17 is optional, whereby without this inlet gas control valve 17 the product gas pressure and the product gas purity can also be guaranteed by the device 15, but with a smaller control range of the product gas flow.

The product purity is controlled because the retentate control valve 19 is controlled as a function of the oxygen concentration measured by the oxygen sensor 12.

If this oxygen concentration is too high and the purity of the product gas is thus too low, the retentate control valve 19 will be closed, such that the pressure in the membrane unit 6 increases and a greater fraction of permeate is obtained and thus the purity of the product gas is increased.

For the rest, the product gas pressure will fall somewhat, which is compensated by increasing the target pressure of the compressor unit 2.

If the purity of the product gas is too high, the control will be reversed.

During this operation the permeate control valve 18 is fully open.

If however the pressure in the membrane unit 6 is low, i.e. equal or practically equal to the desired product gas pressure, the retentate control valve 19 is fully open. This occurs for example if the device 15 has to operate at a low flow rate and/or a low purity.

In such a situation the product gas purity cannot be reduced further if it is too high, by further opening the retentate control valve 19.

In this case the permeate control valve 18 can be used to increase the pressure on the permeate side 9 and thereby produce a less pure product gas.

The control described above can also be implemented differently. It is also possible that the product gas pressure is controlled at a set point by adjusting the position of the retentate control valve 19, and the purity of the product gas is controlled to a set point by adjusting the target pressure of the compressor unit 2.

A combined control in which both the target pressure of the compressor unit 2 and the position of the retentate control valve 19 are adjusted on the basis of the measured product gas purity and product gas pressure is also possible.

Although shown in the device 15 of FIG. 2, a permeate control valve 18 is optional, whereby the device 15 can still operate well in the vast majority of circumstances, but only lacks the possibility to limit the purity of the product gas when operating below its design capacity.

Figure 2:
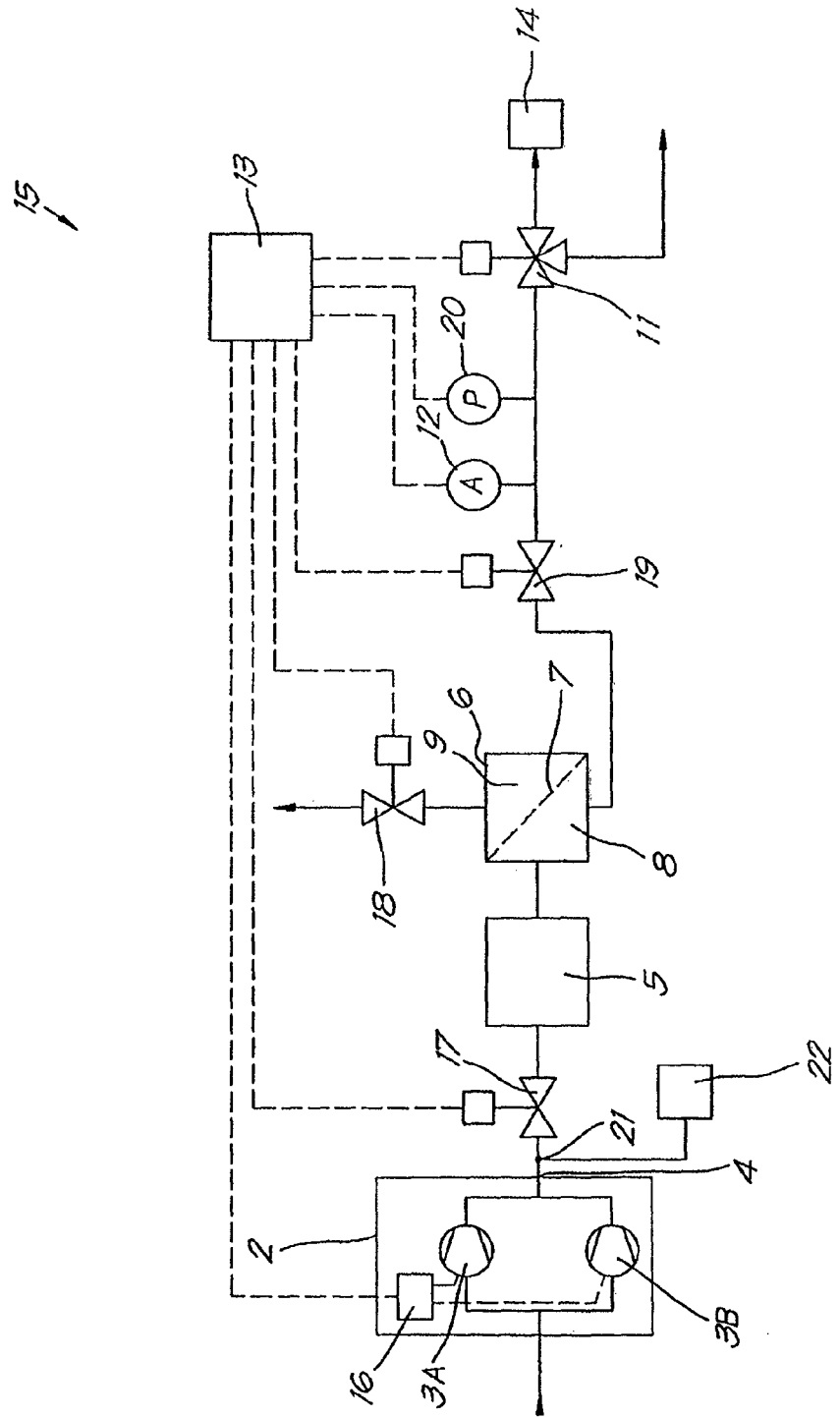
FIGS. 2 and 3 schematically show two variants of the device according to the invention.
Figure 3:
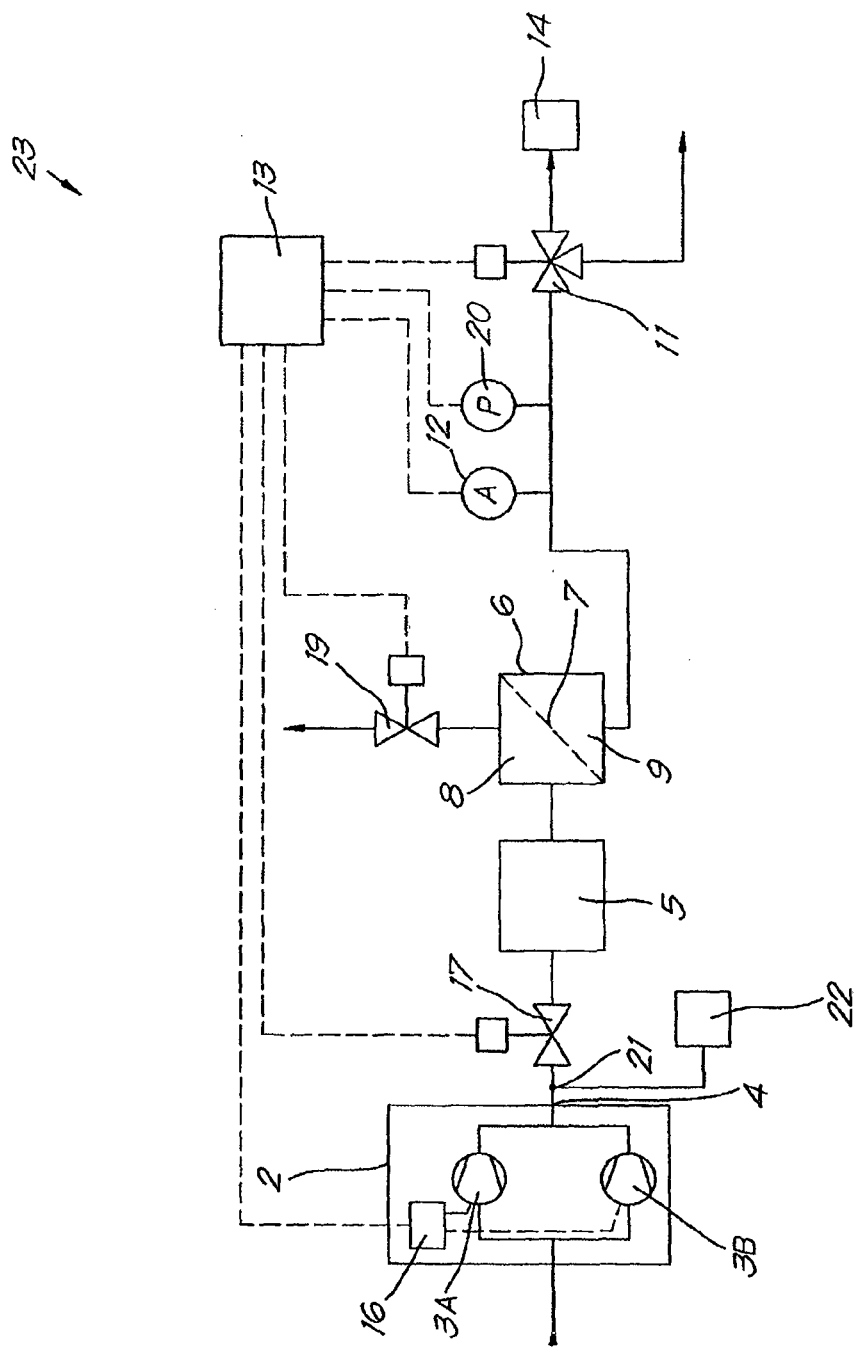

The device 23 according to the invention shown in FIG. 3 is a similar device to device 15 of FIG. 2, with the difference that this device is adapted to a situation in which the permeate, thus not the retentate, is the desired product gas.

The actual differences to the device 15 of FIG. 2 are:

The oxygen sensor 12, pressure sensor 20, and three-way valve 11 are on the permeate side 9 instead of on the retentate side 8, and there is no permeate control valve 18.

The operation of the device 23 is largely similar to device 15, except that due to the absence of the permeate control valve 18 the control relating to it can no longer take place, and that the response of the retentate control valve 19 to an anomalous purity value is the other way around, which means that as the retentate control valve 19 opens further, the purity of the product gas will increase, and vice versa.

For both the device 15 and the device 23, just as for the traditional device 1, if the measured purity exceeds certain limits, the three-way valve 11 is controlled by the control unit 13, with the result that to prevent the supply of a product gas that is outside the required specifications, the three-way valve 11 is put to such a position that the product gas is vented out.

To adjust the flow resistance that the inlet gas, the permeate and the retentate experience, valves are used in the above example.

Alternative systems for this are also possible, such as a combination of parallel open/closed valves, each with a different flow resistance in an open state, and this combination can form a specific flow resistance by selectively opening and closing a number of valves.

The present invention is by no means limited to the embodiments described as an example and shown in the drawings, but a device and method according to the invention, can be realised in all kinds of variants, without departing from the scope of the invention.

The invention claimed is:

1. A device for separating a mixture of gases into a product gas with certain purity requirements and a residual gas, comprising:
    a source for supplying the mixture under pressure and adjustment means to adapt the flow to be supplied by the source;
    a membrane unit connected to the source that can separate the mixture into a permeate gas and a retentate gas, one of which is the product gas;
    means for determining the purity of the product gas; and
    a first control unit for controlling the device, wherein:
    the source is equipped with a second control unit that can control the adjustment means as a function of a target value of the mixture of the gases at a point between the source and the membrane unit;
    the device is equipped with a retentate control system and a measuring instrument for the pressure of the product gas;
    the first control unit has a control connection to the second control unit and to the retentate control system whereby the first control unit comprises an algorithm that can determine the target value on the basis of the pressure and purity of the product gas and can control the retentate control system,
    wherein the product gas is the retentate gas; and
    wherein the device is provided with a permeate control system to which the first control unit has a control connection.

2. The device according to claim 1, wherein the source is a compressor unit that comprises adjustment means, with an outlet that is connected to the membrane unit and whereby the target value is a target value at the outlet.

3. The device according to claim 1, wherein the first control unit can determine and pass on the target value to the second control unit the basis of the pressure of the product gas, and can control the retentate control system on the basis of the purity of the product gas.

4. The device according to claim 1, wherein the target value is a target pressure.

5. The device according to claim 1, wherein the target value is a target flow rate.

6. The device according to claim 2, wherein the device is equipped with an inlet gas control system between the compressor unit and the membrane unit, and in that the first control unit has a control connection to the inlet gas control system.

7. The device according to claim 1, wherein the device is a device for separating air.

8. The device according to claim 1, wherein the product gas is nitrogen.

9. The device according to claim 1, wherein the purity requirements constitute both a minimum concentration and a maximum concentration, whereby this minimum and maximum concentration can relate to the main component of the product gas or to a certain impurity or a group of impurities in the product gas.

10. The device according to claim 1, wherein the means for determining the purity of the product gas comprise a measuring instrument for the purity of the product gas.

11. The device according to claim 10, wherein the device is provided with a buffer for product gas, and in that the measuring instrument for the purity is positioned between the buffer and the membrane unit.

12. The device according to claim 1, wherein the retentate control system is a retentate control valve.

13. A device for separating a mixture of gases into a product gas with certain purity requirements and a residual gas, the device comprising:
    a source for supplying the mixture under pressure and adjustment means to adapt the flow to be supplied by the source;
    a membrane unit connected to the source that can separate the mixture into a permeate gas and a retentate gas, one of which is the product gas;
    means for determining the purity of the product gas; and
    a first control unit for controlling the device, wherein:
    the source is equipped with a second control unit that can control the adjustment means as a function of a target value of the mixture of the gases at a point between the source and the membrane unit;
    the device is equipped with a retentate control system and a measuring instrument for the pressure of the product gas;
    the first control unit has a control connection to the second control unit and to the retentate control system whereby the first control unit comprises an algorithm that can determine the target value on the basis of the pressure and purity of the product gas and can control the retentate control system;
    wherein the source is a compressor unit that comprises adjustment means, with an outlet that is connected to the membrane unit and whereby the target value is a target value at the outlet;
    wherein the device is equipped with an inlet gas control system between the compressor unit and the membrane unit, and in that the first control unit has a control connection to the inlet gas control system; and
    wherein the inlet gas control system is an inlet gas control valve.

14. The device according to claim 1, wherein the permeate control system is a permeate control valve.

15. A method for separating a mixture of gases into a product gas with certain purity requirements and a residual gas, wherein:
    the pressure of the mixture is increased;
    the mixture at an increased pressure is driven through a membrane unit and is separated into a permeate gas and retentate gas, one of which is the product gas;
    the pressure of the product gas is measured;
    the pressure and purity of the product gas are controlled against reference values by a first control unit that adjusts a flow of the retentate gas and by imposing a target value for the pressurised mixture before it flows into the membrane unit at a second control unit that controls adjustment means to obtain the target value;
    the purity of the product gas is determined;
    the first control unit controls a retentate control system, the first control unit having an first control connection to the second control unit and a second control connection to the retentate control system,
    wherein the product gas is the retentate gas, and
    wherein, if the purity of the product gas is too high while the product gas pressure cannot be reduced, this purity is controlled by adjusting the permeate pressure.

16. The method according to claim 15, wherein the pressure of the mixture in a compressor unit equipped with adjustment means is increased.

17. The method according to claim 15, wherein the pressure of the product gas is controlled towards a reference value by imposing the target value for the pressurised gas before it flows into the membrane unit at a second control unit and the purity of the product gas is controlled by adjusting the retentate flow rate.

18. The method according to claim 15, wherein the target value is a target pressure.

19. A method for separating a mixture of gases into a product gas with certain purity requirements and a residual gas, wherein:
- the pressure of the mixture is increased;
- the mixture at an increased pressure is driven through a membrane unit and is separated into a permeate gas and retentate gas, one of which is the product gas;
- the pressure of the product gas is measured;
- the pressure and purity of the product gas are controlled against reference values by a first control unit that adjusts a flow of the retentate gas and by imposing a target value for the pressurised mixture before it flows into the membrane unit at a second control unit that controls adjustment means to obtain the target value; the purity of the product gas is determined;
- the first control unit controls a retentate control system, the first control unit having an first control connection to the second control unit and a second control connection to the retentate control system,
- wherein the pressure of the mixture in a compressor unit equipped with adjustment means is increased, and
- wherein if the compressor unit operates at its minimum capacity, the pressure of the mixture that is brought to the membrane unit is made lower than the pressure at the outlet of the compressor unit by expanding this mixture.

* * * * *